March 4, 1969    E. W. JACKOBOICE    3,430,651
COMPOUND ROTARY VALVE
Filed April 13, 1967    Sheet 1 of 2
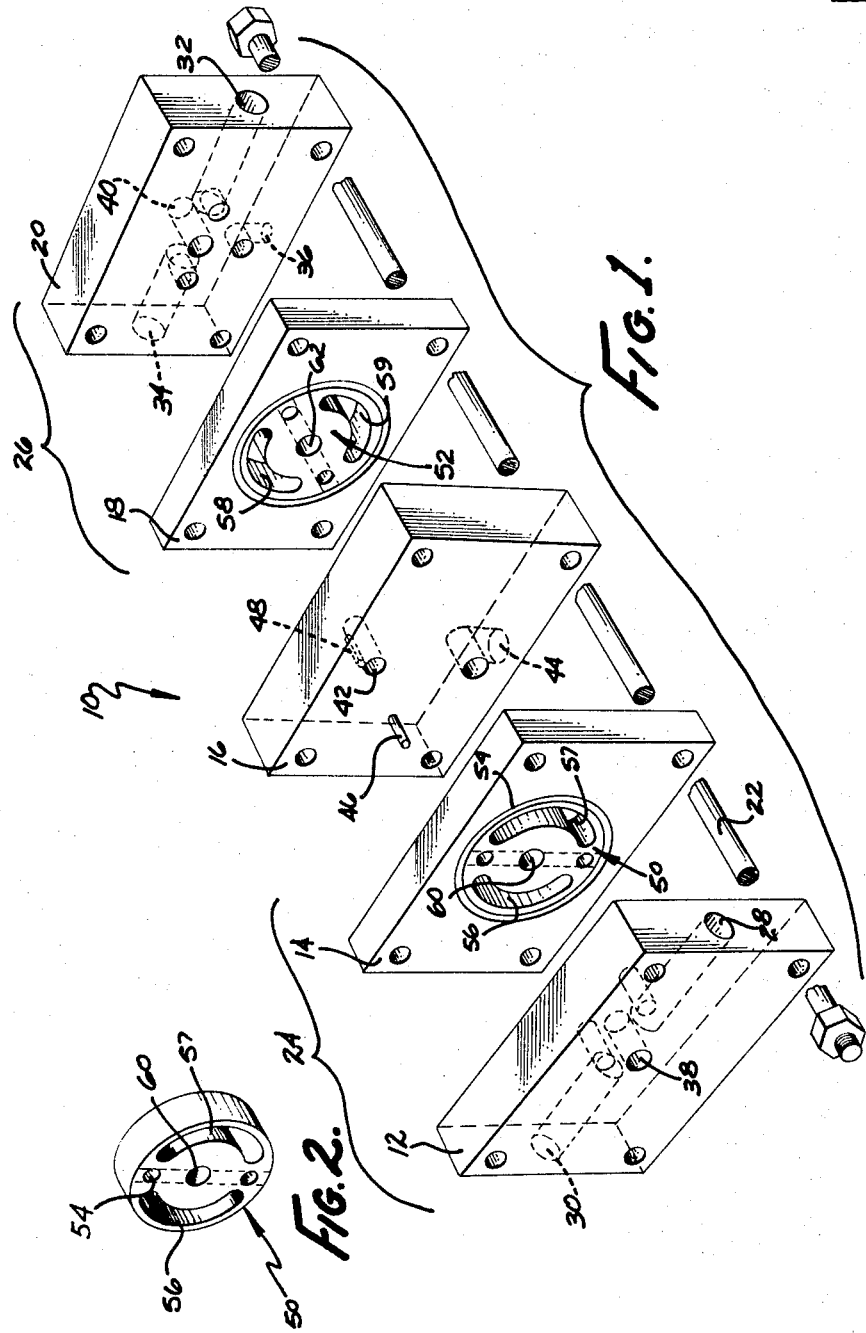
INVENTOR.
EDWARD W. JACKOBOICE
BY Price, Heneveld
Huizenga & Cooper
ATTORNEYS

United States Patent Office 3,430,651
Patented Mar. 4, 1969

3,430,651
COMPOUND ROTARY VALVE
Edward W. Jackoboice, Grand Rapids, Mich., assignor to Monarch Road Machinery Company, Grand Rapids, Mich., a corporation of Michigan
Filed Apr. 13, 1967, Ser. No. 630,644
U.S. Cl. 137—596         13 Claims
Int. Cl. F16k 11/22

ABSTRACT OF THE DISCLOSURE

A hydraulic valve apparatus having a pair of independently actuable internal rotary valve members which are spaced apart by a manifold structure having passages interconnecting the two valve members for fluid flow therebetween. An enclosing housing serves to mount the valve members and provides fluid passages at various positions relative thereto, such that fluid flow through any of a number of such passages may be achieved by controlling the rotary position of each of the internal valve members.

Background of the invention

The field to which the present invention pertains is that of valves for controlling the flow of pressurized hydraulic fluid, and more particularly to hydraulic control valves having numerous independent fluid passages for actuating a plurality of external or remote hydraulic cylinders or the like, each such remote device being independently controllable from a common valve referred to herein as a compound valve.

In the field of hydraulic valves, control of double-acting power cylinders and the like is generally achieved through the use of a four-way valve, the nature of which has become well known. Such valves have four fluid passages, two of which are typically connected to opposite ends of a power cylinder while the other two are respectively connected to a fluid pump and to a fluid reservoir leading into such a pump, the operation being that in a first actuable mode the valve sends pressurized fluid to one end of the cylinder while exhausting fluid from the other end of the cylinder to the reservoir, while in the second actuable mode of the valve the converse situation takes place. Also, it is desirable for such a valve to have a position in which the pressurized fluid from the pump is merely bypassed back to the reservoir, so that no actuation of the power cylinder occurs.

In accordance with present practice, where numerous power cylinders or other such devices are to be controlled a desired plural number of the aforesaid four-way valves are utilized, with individual controlling linkages set up for each such valves. This multiplies the expense involved in such an installation in a direct relationship to the number of valves needed, and imposes space and weight demands which are similarly multiplied. This often involves a very significant penalty, particularly where the space available for an installation is definitely limited and may not include sufficient room to install the required number of individual valves. Also, control problems are created due to the profusion of individual control linkages required.

Summary of the invention

The present invention resolves the aforementioned problems associated with the usage of numerous individual four-way or other control valves by providing a single valve mechanism of a compound nature having a plurality of outlets by which numerous external fluid-actuated devices may be independently controlled. The single compound valve mechanism of the invention is significantly smaller and lighter than the collective numerous individual valves previously necessary for achieving the same control purposes, and it also is significantly easier to actuate and operate. The valve mechanism of the invention has a housing means defining a plurality of fluid passages, each of which have a terminal end within the housing means located in a position to be communicable with either of a pair of rotary internal valve or rotor members. These valve members, which include fluid flow passages formed therein, also may communicate with each other through a central portion of the housing means comprising a manifold. As a result, fluid introduced to the valve mechanism may, by controlling the rotary position of the aforesaid valve or rotor members, be directed outwardly through any of a number of selected fluid passages, to thereby selectively actuate remote power cylinders or the like.

Description of the drawings

FIG. 1 is an exploded perspective view showing the various component parts of the compound valve structure;

FIG. 2 is a frontal perspective view of one of the rotary valve members used in the structure;

Description of a preferred embodiment

Figure 3:
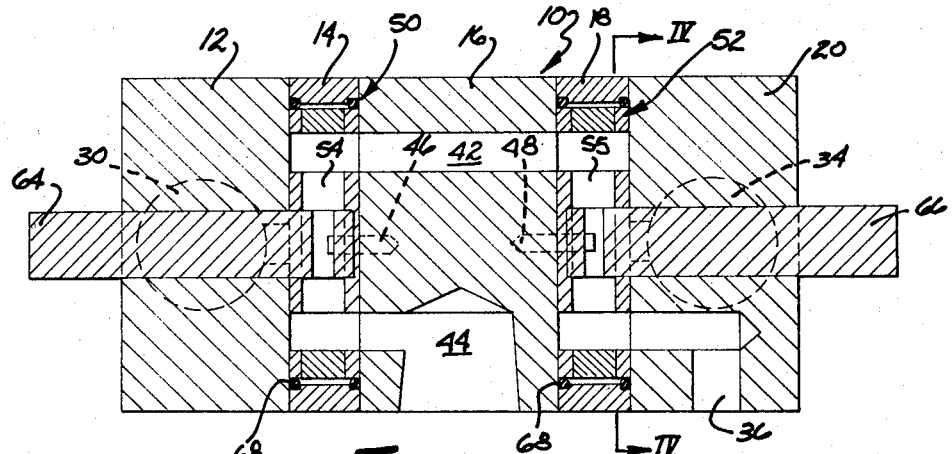
FIG. 3 is an enlarged central sectional elevation of the assembled valve structure.

Referring now in more detail to the drawings, FIG. 1 illustrates the general features of the present valve structure 10, from which it will be seen that the structure is, generally speaking, comprised of a total of five mutually separate housing elements of block-like form. These include a first end element 12, a first intermediate element 14, a center element 16, a second intermediate element 18, and a second end element 20. These housing elements are securable together in a layered, contiguous fashion, as by a plurality of through-bolts, one of which is seen at 22, which pass through apertures found in the corners of each of the housing elements. When the housing elements are secured together they form a composite housing assembly which is referred to herein as a housing means; also, either of the two end elements 12 and 20 taken collectively with its adjacent intermediate element 14 or 18, respectively, is referred to as a housing component means, designated by the characters 24 and 26, respectively. As illustrated, each of the housing elements has a smooth side or end which abuts against the like complementary end of the contiguous element when all of the elements are assembled together.

The two end housing elements 12 and 20 each have a pair of right-angled fluid passages 28 and 30, and 32 and 34, respectively, formed therein so as to extend from a side surface of the housing element to the aforesaid end extremity thereof, where the passages terminate in openings. Also, end housing element 20 has a third such passage 36 extending upwardly from the bottom extremity thereof and opening laterally through the same end as does its passages 32 and 34. As will be seen subsequently, passage 36 forms the exhaust outlet of the valve structure 10. Further, each of the end elements 12 and 20 has a centrally located aperture 38 and 40, respectively, which extends through the end element transversely, from the aforesaid flat end extremity thereof outwardly through the opposite end of the housing element.

The center housing element 16 comprises a manifold. This housing element has a transverse upper passage 42 extending through it from end to end. Also, this housing element has a right-angled lower fluid passage 44 which extends upwardly into it from its bottom extremity and terminates in an opening in one of the flat ends of this element. Additionally, the manifold 16 has a pair of stop pins 46 and 48 extending laterally out of each end thereof, for engaging other portions of the valve structure to be noted subsequently.

Slidably fitted into a centrally located recess in each of the intermediate housing elements 14 and 18 is a rotor member 50 and 52, respectively, which together comprise the rotary valve members noted previously herein. These two members are identical, and member 50 is shown in detail in FIG. 2 as exemplary of either. As illustrated, the rotor members are generally cylindrically shaped, having a circular cross-section and having regularly smooth end faces which smoothly abut the end surfaces of the housing elements which are positioned adjacent each of their sides, due to the fact that the thickness or width of the rotor members is the same as that of the intermediate housing elements 14 and 18 in which the rotor members are mounted or housed (see FIG. 3). Each of the rotor members is rotatable within its housing element, and the phrase "regularly smooth" used to describe the end faces of the rotor members is merely intended to mean that these are surfaces of revolution.

Each of the rotors 50 and 52 has a first passage 54 or 55, respectively (FIGS. 2 and 3), which extends diametrically within it and which also extends laterally thereof near the circular periphery of the rotor to provide end openings communicating with each of the end faces of the rotor member. Also, each rotor member 50 and 52 has a pair of curved slots 56, 57 and 58, 59, respectively, extending through it from one of the end faces to the other. As illustrated, the curved slots in each rotor are symmetrically located on either side of the passages 54 or 55 and, together with the diametrally opposed end openings of the latter which are present on each of the end faces of the rotors, these curved slots define a locus which is circular in form. The curved slots 56, 57, and 58, 59 in either rotor form arcuate fluid passages, as will be seen subsequently.

In addition to the passages which have been described just above, each rotor member has a hole 60 and 62, respectively which extends transversely into it on its center, which also is its axis of rotation within its respective intermediate housing element. The apertures or holes 60 and 62 in the respective rotor members 50 and 52 are in direct register with the apertures 38 and 40 in the end housing elements 12 and 20, respectively, when the end housing elements are aligned with and secured to the intermediate housing elements.

Figure 4:
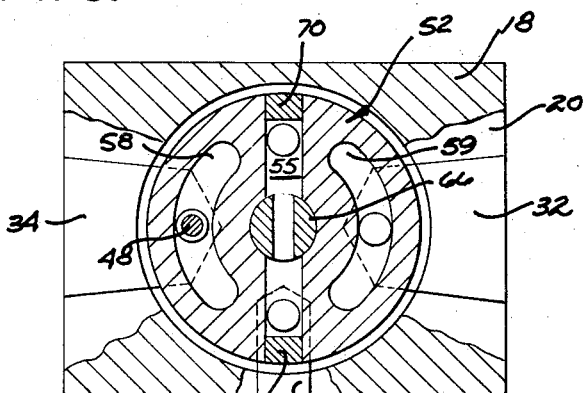
FIG. 4 is a fragmentary sectional end elevation taken through the vertical plane IV—IV of Fig. 3.
Figure 5:
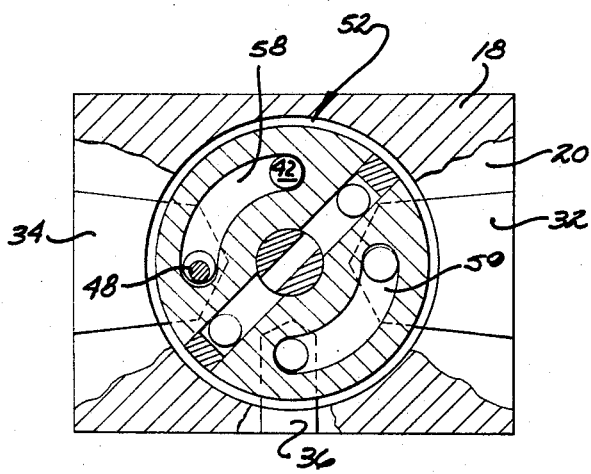
FIG. 5 is a sectional elevation similar to FIG. 4 but showing a changed position of the parts therein to illustrate a second control configuration.

The relative positioning of the various component parts of the compound valve structure 10 is illustrated in FIGS. 3, 4, and 5. As illustrated, all of the housing elements fit smoothly together in a layered, contiguous fashion, with the opposite end faces of the two rotor members 50 and 52 smoothly abutting the complementary end extremities of the intermediate and center housing elements immediately adjoining the respective rotors. A control shaft 64 is provided for rotor 50, and a similar shaft 66 provided for rotor 52. Each of these shafts extends through the aperture 38 or 40 in the end housing elements 12 and 20, respectively, and into the central apertures 60 and 62 on the axis of the respective rotors 50 and 52 (FIG. 3). The control shafts are rotatable within the end housing element apertures, but are secured to the respective rotor members, so that by turning the projection portions of the control shafts, either of the rotor members may be turned or rotated within the intermediate housing element enclosing that rotor. As FIG. 3 illustrates, circular O-ring seals 68 are located in appropriate annular recesses within each of the intermediate housing elements 14 and 18 for contact with the circular periphery of each of the rotor members 50 and 52, and also for contact with both the end and center housing elements which abut such intermediate elements.

As previously stated, the passages 54 and 55 in the rotor members 50 and 52, respectively, extend diametrically inside the respective rotors, and these passages also communicate with each of the two end faces of the rotor members at points near the circular periphery ends of the rotors (FIG. 4), so that the end openings of the elongated passages located on either side or face of the rotor members fall within a circular locus pattern which also includes the curved slots such as 58 and 59. This locus pattern is concentric with the rotor itself and has the same axis of rotation as the rotor. The passages 54 and 55 are most conveniently formed by drilling diametrally through the rotors from one peripheral edge to the other, and then closing the end extremities of the drilled hole by means of plugs 70 or the like (FIG. 4). Obviously, such holes can be drilled with one blank, so that only one of the plugs 70 is required to close it. Transverse holes are then drilled through the rotors from one end face to the other to pass through the diametral hole, so that the diametral hole is made to communicate with both end faces of the rotor at the two positions described above. Each of the control shafts 64 and 66 includes a transverse passage therein which is located in alignment with the passages 54 and 55 to assure fluid passage from one end to the other thereof. The curved slots forming the pairs of passages 56, 57 and 58, 59 in the respective rotors are preferably milled therein, as with an end mill, whereas other passages having straight portions, such as passages 28 and 30, 42 and 44, etc., are preferably formed by drilling intersecting holes. The particular sizes of such holes are of course, a matter of some discretion depending upon the facts of particular installation situations.

With the valve structure assembled in the form shown in FIG. 3, the following paths for fluid flow within the valve structure are obtainable through controlling the rotation of one or the other of the rotor members. With each rotor member positioned in the manner shown in FIGS. 3 and 4, i.e., with both diametral fluid passages 54 and 55 oriented vertically, the lower inside opening of passage 54 in rotor 50 will be in direct alignment with the right-angled passage 44 in the manifold 16. Passage 44 provides the inlet to the valve structure for fluid under pressure, and consequently such fluid is communicated into the vertically oriented passage 54. Both the upper and lower outside openings of passage 54 are abutted against the smooth inside face of the end housing element 12; however, the upper inside opening of passage 54 is in direct alignment with passage 42 in the upper extremity of the manifold structure 16, and fluid is consequently communicated into this passage. A similar situation exists with respect to rotor member 52 and the end housing element 20 positioned adjacent the same. That is, the passage 55 in rotor member 52 conducts fluid from passage 42 downwardly and through the right-angled passage 36 in end housing element 20. Passage 36 forms the bypass or exhaust outlet of the valve structure, through which fluid is recirculated to the reservoir of a conventional hydraulic pump.

If rotor member 52 is now rotated by its control shaft 66 to the position shown in FIG. 5 (in which position it is indexed by stop pin 48 contacting an end extremity of the curved slot 58 in this rotor), a different situation will be seen to exist. In this case, fluid from passage 42 in the manifold structure 16 now communicates with the upper end of the arcuate slot 58 in the rotor. The lower end of this slot communicates with passage 34 in the end housing element 20, which in practice will be coupled to an external device such as a power cylinder or the like and which will receive pressurized fluid through the flow path just described. At the same time, the other arcuate slot or passage 59 in rotor 52 has been positioned so that its upper end is in communication with passage 32 of end housing element 20, whereas its lower extremity is in communication with passage 36 forming the exhaust outlet of the valve structure. Consequently, a cylinder connected to passage 34 will receive pressurized fluid, whereas a cylinder connected to passage 32 will exhaust its pressurized fluid out of the outlet passage 36. In this position of the rotor member, the passage 55 is not in communication with any passage in either the manifold 16 or the end housing element 20, and so is blocked.

It should be clear that if rotor member 52 is rotated in a direction opposite to that shown in FIG. 5, an opposite set of circumstances will be produced. That is, passage 34 will be placed in communication with passage 36 by the arcuate slot or passage 58, whose upper end extremity will now be indexed against stop pin 48 to limit rotation of the rotor. Under these circumstances, passage 32 will be linked in flow communication to manifold passage 42 by the arcuate slot 59. Consequently, fluid will be bypassed or returned from passage 34 out of the outlet passage 36, whereas pressurized fluid from manifold passage 42 will be conducted out of passage 32.

In a similar manner, fluid from the inlet passage 44 in the manifold structure may, by selective rotation of rotor 50, be conducted through either of the arcuate passages or slots 56 and 57 in this rotor member directly out of the passages 28 or 30 in end housing element 12, in which case the pressurized fluid from inlet 44 is not conducted into the upper manifold passage 42 for communication to rotor 52. However, only one of the passages 28 and 32 can be supplied pressurized fluid at any one time, and the other such passage will at such time be in flow communication with manifold passage 42 and rotor 52. Thus, depending upon the position selected for rotor 52, the aforesaid other passage of end housing element 12 may be placed in communication either with passage 32, passage 34, or passage 36 of the opposite end housing element 20.

By means of the present novel form of compound valve structure, it will thus be apparent that a single compact unitary valve structure may be used to control a plurality of external power cylinders or the like in a simple and positive manner. Any one of the external cylinders may be supplied pressurized fluid at any given time, while any other such cylinders may be by-passed or relieved at the same time. Consequently, very significant advantages in flexibility of installation are provided, along with significant advantages in size, weight, and overall economy.

It is entirely conceivable that upon examining the foregoing disclosure, those skilled in the art may devise embodiments of the concept involved which differ somewhat from the embodiment shown and described herein, or may make various changes in structural details to the present embodiment. Consequently, all such changed embodiments or variations in structure as utilize the concepts of the invention and clearly incorporate the spirit thereof are to be considered as within the scope of the claims appended herebelow, unless these claims by their language specifically state otherwise.

I claim:

1. A compound rotary valve structure, comprising: a first and a second rotor member, each of circular cross-section with a central axis of rotation, and each having at least one regularly smooth end face extending diametrally across the circular cross-section thereof; each of said rotor members defining a first fluid passage extending diametrally thereacross and in communication at opposite ends with said end face; each of said rotor members also defining a pair of second fluid passages symmetrically located on either side of said first passage, in the same general plane as the latter, and in communication with said end face; housing means enclosing at least the circular peripheral portion of each of said rotor members, such that the latter are rotatable within said housing means about their said axis of rotation, and mounting each of said rotor members with their respective end faces located with the said passages in each rotor member in communication with such passages in the other when the two rotor members are brought into a predetermined relative alignment by rotation thereof; said housing means defining a plurality of individual fluid passages, each located so as to be brought into flow communication with one of the said fluid passages in said first or second rotor members when such rotor member is rotated to a predetermined position within the housing means; one of said individual fluid passages defined by said housing means providing an inlet for fluid under pressure, another of such passages providing a return outlet for recirculating fluid, and various relative rotational positions of said first and second rotor members directing pressurized fluid out of various selected ones of the others of said individual fluid passages.

2. The compound valve structure defined in claim 1, wherein said housing means includes a manifold defining at least one fluid passage interconnecting areas on each of said rotor member end faces, such that fluid may flow from one of said passages in one rotor into another such passage in the other rotor through said manifold passage.

3. The compound valve structure defined in claim 2, wherein each of said rotor passages communicates with the end face of its respective rotor member through openings in such end face whose locus is a circular pattern having as a center the axis of rotation of such rotor member, and wherein said manifold passage has opposite end openings, each located adjacent a point on the circular locus of one of said rotor members, such that rotation of each of said rotor members brings different ones of its said end face openings into register with one of said manifold passage openings.

4. The compound valve structure defined in claim 3, wherein said rotor members are oriented with their said end faces facing towards each other, and wherein said manifold is between such end faces; said manifold having regularly smooth opposite end extremities complementary to and abutting at least one of said rotor member end faces; said manifold passage extending between its said end extremities and said opposite end openings of such passage being located in the said end extremities thereof.

5. The compound valve structure defined in claim 4, wherein the said individual passage defined by said housing means which provides said fluid inlet is located in said manifold and opens out of one of said end extremities thereof to communicate with the end face of one of said rotor members.

6. The compound valve structure defined in claim 5, further including a stop means acting between said manifold and portions of at least one of said rotor members located adjacent such manifold for limiting the allowable rotational movement of such rotor member with respect to said manifold.

7. The compound valve structure defined in claim 4, wherein said housing means is comprised of at least three separate housing components secured together to form a composite assembly, a first one of said components enclosing and mounting said first rotor member and defining a first series of said individual passages communicating with said passages in said first rotor member, a second one of said components enclosing and mounting said second rotor member and defining a second series of said individual passages communicating with said passages in said second rotor member, and a third one of said components comprising said manifold.

8. The compound valve structure defined in claim 7, wherein each of said first and second components comprises a pair of mutually separate housing elements, one of such elements in each pair enclosing and mounting the respective rotor member and the other such element in the pair defining the respective series of passages.

9. The compound valve structure defined in claim 8, wherein said rotor members each have a pair of oppositely disposed end faces, and wherein the said pair of second passages of each rotor member are in communication with each of the end faces of that rotor member; each of said passages in the series thereof defined by said other housing elements terminating in an end opening located in an end face of each such element which is located adjacent an end face of the rotor member positioned closest thereto; said passage end openings being communicable with the passages in such rotor when such passages and end openings are brought into register by rotation of such rotor.

10. The compound valve structure defined in claim 9, wherein said pair of passages are circularly curved slots extending through said rotor members from one of said oppositely disposed end faces to the other thereof; each of said slots defining at least in part a circular locus pattern on each of said rotor member end faces; and said end openings of said passages in said series each being of a size smaller than the length of said slots and being arranged adjacent a point on one of said locus patterns.

11. The compound valve structure defined in claim 10, wherein said housing means comprises five mutually separate housing elements of block-like form securable together in a layered contiguous fashion to form a composite housing assembly having two end elements, two intermediate elements between said end elements, and a center element between said intermediate elements; each of said elements having a flat end extremity abutting a like end extremity of the element contiguous thereto; said rotor members each comprising a cylindrical segment with flat end faces; each of said intermediate housing elements having a cylindrical aperture therethrough for slidably receiving one of said rotor members, and each such housing element having a width substantially the same as that of the rotor member received thereby, such that each of said rotor member end faces is flush with one of the flat end extremities of the respective intermediate housing element; said end housing elements each defining therewith a series of said passages, with the said end openings of such passages each located on the flat end extremity of such end element which adjoins both the like end extremity of the intermediate element contiguous thereto and the end face of the rotor member which is flush with such intermediate element side, said passage end openings further located adjacent points on the circular locus pattern of the contiguous rotor member end face; said center housing element comprising said manifold.

12. The compound valve structure defined in claim 11, further including a stop pin extending laterally from each side of said manifold and located at a point adjacent the circular locus pattern of the rotor member end face conttiguous thereto, said pins each extending into one of said curved slots in said rotor members to abut the ends thereof and thereby limit the allowable rotation of the rotor members.

13. The compound valve structure defined in claim 12, wherein each of said housing end elements has an aperture formed therethrough which extends through the flat end extremity thereof abutting the rotor member contiguous thereto and which is located on a projection of the axis of rotation of such rotor member; said rotor members each having a control shaft attached thereto at the rotational center thereof; said control shafts each extending through the aforesaid aperture of the contiguous housing end element and protruding beyond such element; said control shafts when rotated rotating the respective rotor members attached thereto within their respective intermediate housing elements.

References Cited

UNITED STATES PATENTS

| | | | |
|---|---|---|---|
| 2,220,479 | 11/1940 | De Bell | 137—625.23 XR |
| 2,328,606 | 9/1943 | Boldt | 137—625.23 XR |
| 2,807,280 | 9/1957 | Kittredge | 251—367 XR |

HENRY T. KLINKSIEK, *Primary Examiner.*

U.S. Cl. X.R.

137—613